(12) United States Patent
Jacob

(10) Patent No.: US 6,241,615 B1
(45) Date of Patent: Jun. 5, 2001

(54) CONSTANT VELOCITY FIXED JOINT WITH AN AXIALLY MOUNTABLE CAGE

(75) Inventor: Werner Jacob, Frankfurt (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/350,849

(22) Filed: Jul. 9, 1999

(30) Foreign Application Priority Data

Jul. 10, 1998 (DE) ................................. 198 31 011

(51) Int. Cl.$^7$ ........................................ F16D 3/223
(52) U.S. Cl. ................................ 464/145; 464/906
(58) Field of Search .................... 464/139, 140, 464/141, 142, 143, 144, 145, 146, 106, 906

(56) References Cited

U.S. PATENT DOCUMENTS

| | | | |
|---|---|---|---|
| 3,324,682 | * 6/1967 | Bendler | 464/145 |
| 3,447,341 | * 6/1969 | Miller, Jr. | 464/141 |
| 3,475,924 | * 11/1969 | Aucktor | 464/141 |
| 3,935,717 | * 2/1976 | Welschof | 464/145 |
| 4,023,382 | * 5/1977 | Welschof | 464/141 |
| 4,231,232 | * 11/1980 | Otsuka et al. | 464/141 |
| 4,275,571 | * 6/1981 | Welschof | 464/141 |
| 5,221,233 | * 6/1993 | Jacob | 464/145 |
| 5,410,902 | 5/1995 | Jacob . | |
| 6,120,382 | * 9/2000 | Sone et al. | 464/145 |

FOREIGN PATENT DOCUMENTS 2 203 219  12/1988  (GB) .
2 212882   2/1989   (GB) .

* cited by examiner

Primary Examiner—Lynne H. Browne
Assistant Examiner—Kenn Thompson

(57) ABSTRACT

The invention relates to a constant velocity fixed joint whose outer part (1) and inner part (3) for guiding the balls (5) comprise two alternately arranged sets of first outer running grooves (14) and opposed first inner running grooves (17) which start from opposed open ends (10, 11) and extend in meridian planes in an undercut-free way, as well as second outer running grooves (15) and opposed second outer running grooves (18). To facilitate assembly, the cage (4) arranged between the inner part (3) and the outer part (1) comprises a cylindrical portion whose diameter is smaller than the diameter of a circular free passage in the region of the first open end (10) of the outer part (1).

4 Claims, 3 Drawing Sheets

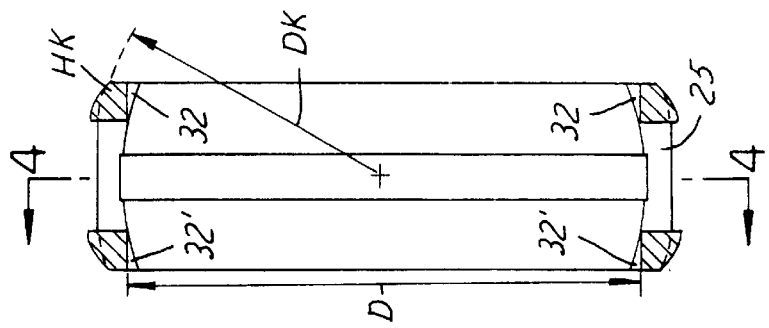
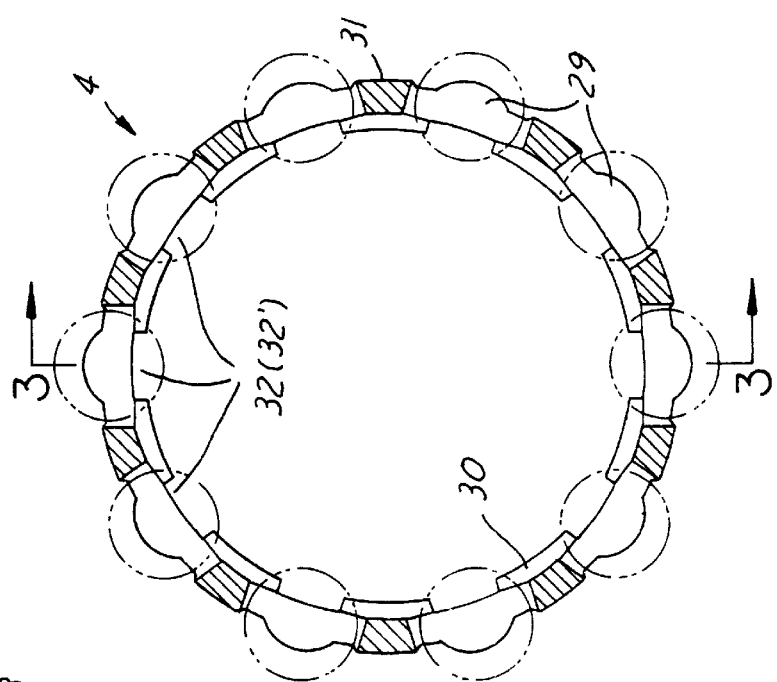
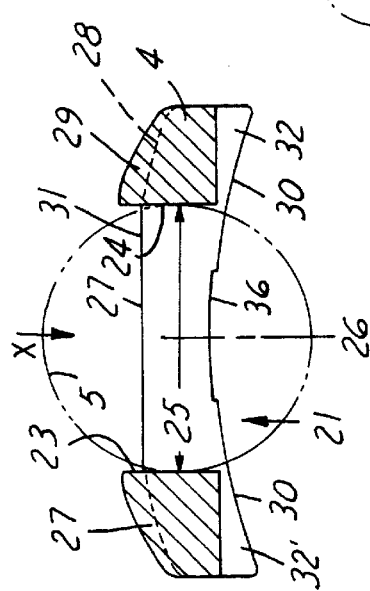
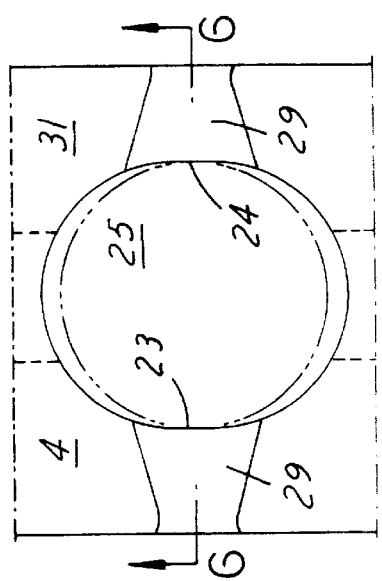

CONSTANT VELOCITY FIXED JOINT WITH AN AXIALLY MOUNTABLE CAGE

BACKGROUND OF THE INVENTION

The invention relates to a constant velocity fixed joint.

DE 40 31 820 C2 describes a constant velocity fixed joint whose outer part comprises a first open end and a second open end. It comprises a cavity which is centered on the longitudinal outer part axis and which is open towards both open ends. Furthermore, in its inner face delimiting its cavity, the outer part comprises two types of outer running grooves which are arranged in a regular sequence around the longitudinal outer part axis in meridian planes relative to the latter. The first outer running grooves start from the first open end and extend towards the second open end. The second outer running grooves start from the second open end and extend towards the first open end. All outer running grooves extend in a curve-like and undercut-free way from the open end from which they start.

In the cavity of the outer part, there is arranged in inner part. The inner part comprises a longitudinal inner part axis and a spherical outer face which is provided with first and second inner running grooves which are arranged opposite the first and second outer running grooves and extend in meridian planes relative to the longitudinal inner part axis. The first inner running grooves are arranged opposite the first outer running grooves in such a way that they form pairs, with the first inner running grooves starting from the first open end and extending towards the second open end in a curve-like and undercut-free way.

The second inner running grooves are arranged opposite the second outer running grooves and form pairs therewith, with the second inner running grooves starting from the second open end and extending towards the first open end in a curve-like and undercut-free way.

Between the inner face of the outer part and the spherical outer face of the outer part and the spherical outer face of the inner part there is arranged a cage whose spherical outer face comprises play relative to the inner face of the outer part. The cage is provided with a cylindrical bore which is held with play relative to the spherical outer face of the inner part. The cage is provided with radial apertures which are distributed in accordance with the pairs of inner running grooves and outer running grooves. The apertures form windows which guide the balls between the lateral guiding faces.

For torque transmitting purposes, the balls engage between the outer part and inner part into the outer running grooves and inner running grooves forming pairs. The centers of all balls are held in a plane which contains the window centers between the lateral guiding faces. The cage is centered entirely by the balls.

The above-described design is disadvantageous in the case of constant velocity joints rotating at high speeds such as they occur, for example, in the propeller shaft for transmitting a rotational movement in passenger cars from the front drive unit of same to the rear axle drive for rear wheel drive vehicles. In particular, vibrations occur due to the displacement of the center of gravity of the cage, as a result of which a centrifugal force is generated.

DE 40 42 390 C2 proposes a constant velocity fixed joint whose design corresponds to that of the joint described in DE 40 31 829 C2. However, the cage is divided; it comprises a spherical inner face and lugs in the region of the lateral guiding faces, with said lugs increasing the size of the lateral guiding faces outwardly.

SUMMARY OF THE INVENTION

It is an object of the invention to provide an improved constant velocity fixed joint which can be easily and quickly assembled and whose cage, nevertheless, securely guides the balls when the cage is articulated relative to the outer part and the inner part respectively.

The foregoing and other objects are achieved by providing a constant velocity fixed joint having an outer part which comprises a first open end and a second open end, a longitudinal outer part axis, a cavity which is centered on the longitudinal outer part axis and is open towards both open ends, and first outer running grooves and second outer running grooves in its inner face delimiting the cavity. The first outer running grooves and the second outer running grooves are arranged in a regular sequence around the longitudinal outer part axis in planes which are distributed around the longitudinal outer part axis and contain same. Further, the first outer running grooves, starting from the first open end, extend in a curve-like and undercut-free way towards the second open end. The second outer running grooves, starting from the second open end, extend towards the first open end in a curve-like and undercut-free way. The constant velocity fixed joint further includes an inner part which is arranged in the cavity of the outer part and which comprises a longitudinal inner part axis, a spherical outer face and first inner running grooves and second inner running grooves which extend in the spherical outer face in planes which are distributed around the longitudinal inner part axis and contain same. Each of the first inner running grooves are arranged opposite a first outer running grove and, while starting from the first open end, extend in a curve-like and undercut-free way towards the second open end. Each of the second inner running grooves are arranged opposite a second outer running groove and, while starting from the second open end, extend in a curve-like and undercut-free way towards the first open end. The constant velocity joint also includes an annular cage which comprises an outer face, an inner face, a longitudinal cage axis and windows which are distributed in accordance with the pairs of opposed first outer running grooves and first inner running grooves as well as with the pairs of second outer running grooves and second inner running grooves and which are open towards said grooves. The windows comprise guiding faces which are offset along the longitudinal cage axis and are arranged opposite one another. The annular cage further comprises outer lugs which project from the outer face and which are arranged in the region of the windows to one side of the guiding faces for the purpose of outwardly lengthening the latter. The annular cage is further arranged between the inner part and the inner face of the outer part, with its outer face being held at a distance from the inner face. The cage includes balls which are each associated with a window for the purpose of engaging an associated first outer running groove and first inner running groove as well as an associated second outer running groove and a second inner running grove, and which are guided between the guiding faces. The outer face of the cage, in the circumferential direction between the lugs, also comprises a cylindrical portion whose axis is formed by the longitudinal cage axis and whose cylinder diameter is smaller than the free open diameter of the first open end. Furthermore, the outer face of the cage is provided with end portions which extend inside an envelope sphere which envelops same and whose center is located in the point of intersection between a plane and the longitudinal cage axis. The plane contains the centers of all windows between the guiding faces. The diameter of the envelope sphere is greater than the cylinder diameter.

The advantage of the present embodiment is that the cage, together with the inner part, can be inserted into the outer part with the balls associated with the first set of inner running grooves. An assembly procedure involving over-articulation only takes place for the balls associated with the second set of inner and outer running grooves. Accordingly, it is possible to automate the first assembly stage concerning the fitting of the cage and inner part and pushing the associated balls into the first inner running grooves as well as inserting said unit into the outer part and engagement of the balls in the first outer running grooves.

According to a preferred embodiment, the end portions also have a spherical shape and are adapted to the shape of the envelope sphere.

Guidance of the cage and the assembly of same is improved further in that the inner face of the cage comprises a hollow spherical portion by means of which the cage is guided on the spherical outer face of the inner part and in that the cage, in its inner face, is provided with assembly grooves which are positioned in the region of the windows and end therein and start from at least one end face.

For assembling the components of the constant velocity fixed joint in accordance with the invention, it is proposed that first the cage, in a turned position, is slid by means of the assembly grooves over the inner part and is subsequently rotated relative to the inner part in such a way that the windows overlap with the first and the second inner running grooves. Thereafter, the balls are introduced from the outside through the windows of the cage, which windows are associated with the first inner running grooves, into the first inner running grooves. Thereafter, the unit consisting of the cage, the inner part and the balls is introduced axially into the outer part, so that the balls engage the first outer running grooves. Subsequently, the inner part is articulated relative to the outer part in such a way that a window as yet unoccupied by a ball becomes accessible from the second open end, through which window a ball is introduced into the associated inner running groove. This operation is then repeated for the subsequent windows after the joint has been rotated by one track division of the second running grooves into the articulated condition. Alternatively, initially, the inner part and the outer part can be temporarily moved back in the aligned position relative to one another, in the course of which movement the ball is transferred into the second outer running groove of the outer part and subsequently, the inner part is again articulated relative to the outer part for the purpose of exposing the next window.

BRIEF DESCRIPTION OF THE DRAWINGS

A preferred embodiment of the inventive constant velocity fixed joint and the assembly of same will be described in greater detail with reference to the drawing wherein:

FIG. 3 shows the cage as an individual component in the form of a longitudinal section along sectional line III—III of FIG. 4.

FIG. 4 is a side view according to FIG. 3 in section along sectional line IV—IV of FIG. 3.

FIG. 5 shows part of a plan view of the cage, concerning the portion which contains a window, in the direction of arrow X of FIG. 6, in an enlarged scale relative to FIGS. 3 and 4.

FIG. 6 is a section along sectional line VI—VI of FIG. 5, in an enlarged scale relative to FIGS. 3 and 4.

DETAILED DESCRIPTION OF THE PREFERRED EMBODIMENTS

Figure 1:
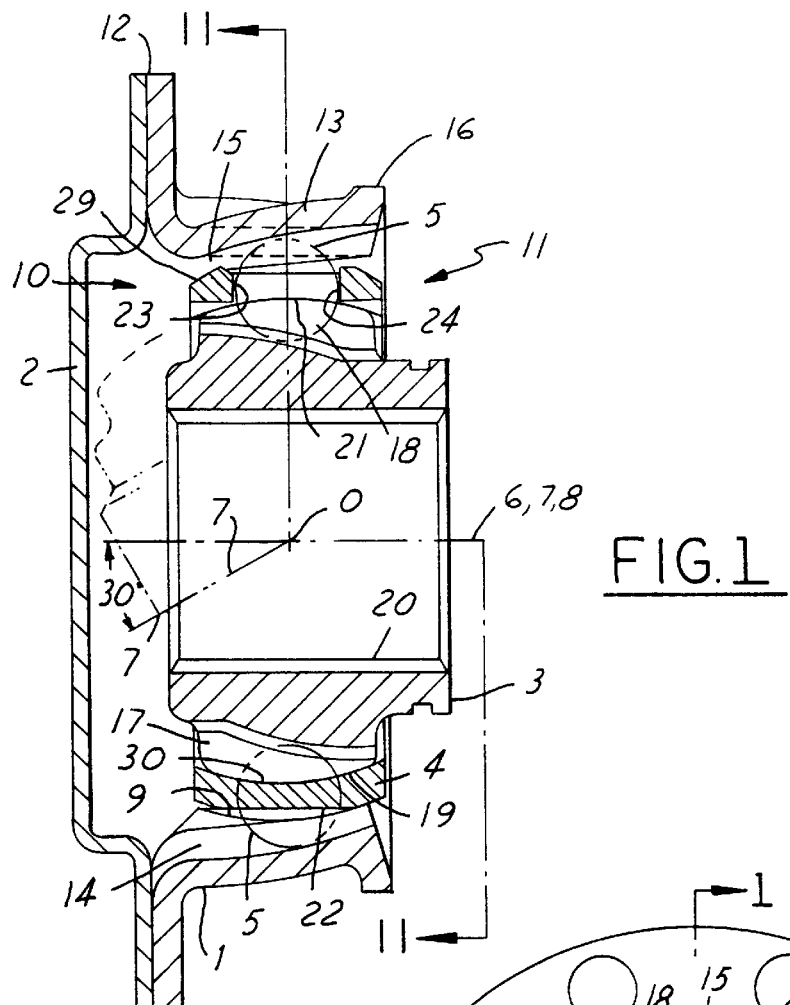
FIG. 1 is a longitudinal section, through sectional line I—I of FIG. 2, of an inventive constant velocity fixed joint in a first embodiment wherein the outer part comprises an integral flange.
Figure 2:
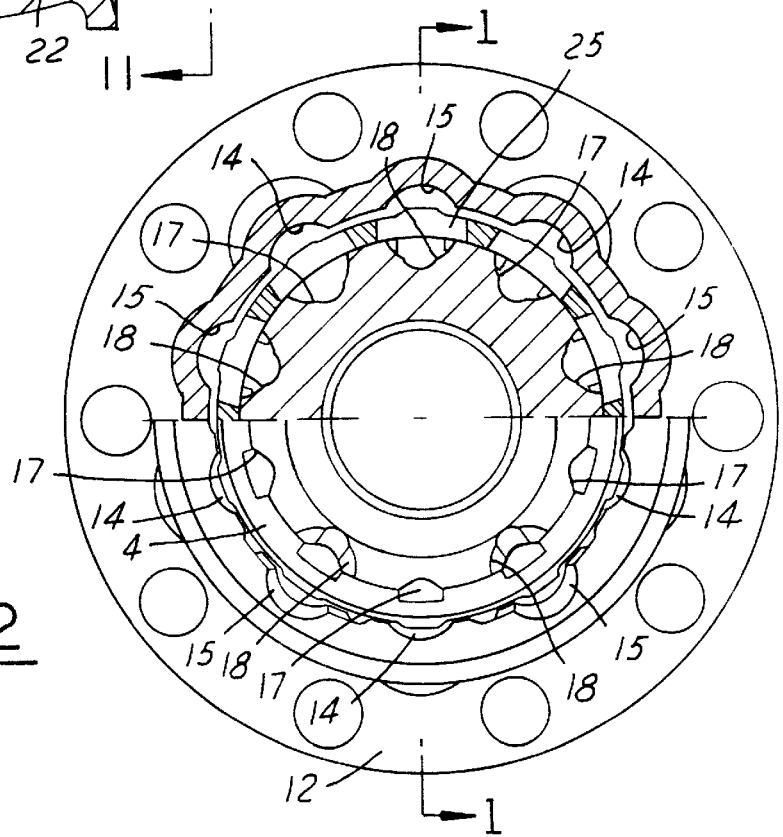
FIG. 2 shows a constant velocity fixed joint according to FIG. 1, half as a side view and half as a side view section, according to the sectional line II—II of FIG. 1.

FIGS. 1 and 2 will be described jointly. The Figures show a constant velocity fixed joint with an outer part 1, a cover 2 covering the outer part 1 on one side, with an inner part 3 received in a cavity of the outer part 1, and with a cage 4 which is arranged between the outer part 1 and the inner part 3 and which holds balls 5 which serve to transmit torque between the outer part 1 and the inner part 3.

The components of the constant velocity fixed joint are shown in continuous lines in the aligned position so that the longitudinal outer part axis 6, the longitudinal inner part axis 7, and the longitudinal cage axis 8 coincide. Furthermore, the figures show the inner part 3 relative to the outer part 1 in dash-dotted lines in a position articulated by an articulation angle of 30° relative to the longitudinal outer part axis 6, with longitudinal inner part axis 7 also being shown.

The longitudinal cage axis 8 of the cage 4 is an intermediate position between the two, i.e. when the inner part 3, by means of its longitudinal inner part axis 7, is articulated relative to the longitudinal outer part axis 6 of the outer part 1 by 30°, the cage 4 passes through an angle of 15°. It is set to half the articulation angle.

In the case of constant velocity joints, the balls 5 are controlled into the angle-bisecting plane and held by the cage 4. The outer part 1 comprises a continuous cavity, so that it has two open ends, a first open end 10 and a second open end 11. The inner face of the outer part 1 in the region between the two open ends 10, 11 has been given the reference number 9.

Furthermore, it can be seen that the outer part 1 is provided with a flange 12 which starts from the portion 13 and extends outwardly, away from the longitudinal outer part axis 6 and is provided at the first open end 10. Said open end 10 is closed by the cover 2 which also comprises a flange-like portion which rests against the flange 12. Furthermore, the flange 12 and the cover 2 comprises fixing bores which are circumferentially distributed around the longitudinal outer part axis 6 and which serve to secure the outer part 1 to a driving or driven component. Such constant velocity fixed joints are intended to be used for example in drivelines of motor vehicles (passenger cars) for driving the wheels.

In the inner face 9 of the outer part 1, there are provided two sets of outer running grooves 14, 15. The first outer running grooves 14, while starting from the first open end 10, are arranged in planes which are distributed around the longitudinal outer part axis 6 and contain same. The first outer running grooves 14, while starting from the first open end 10, extend towards the second open end 11 in an undercut-free and curve-like way, so that their track bases progressively approach the longitudinal outer part axis 6. The second outer running grooves 15 are also arranged in planes which are distributed around the longitudinal outer part axis 6. They start from the second open end 11 and extend towards the first open end 10 in a curve-like and undercut-free way, so that they progressively approach the longitudinal outer part axis 6. The first outer running grooves 14 alternate with the second outer running grooves 15 on the circumference around the longitudinal outer part axis 6. There are provided five first outer running grooves 14 and five second outer running grooves 15, so that, in the outer part 1, one first outer running groove 14 and one second outer running groove 15 are arranged diametrically relative to one another.

The outer part 1 is produced from a plate metal sheet or from a tube and comprises a substantially uniform wall thickness around the circumference. Furthermore, in the region of the second open end 11, the wall of the outer part 1 is formed into a collar 16 which has a reinforcing function. At the other end, i.e. in the region of the first open end 10, the flange 12 provides a corresponding degree of stiffness.

Figure 7:
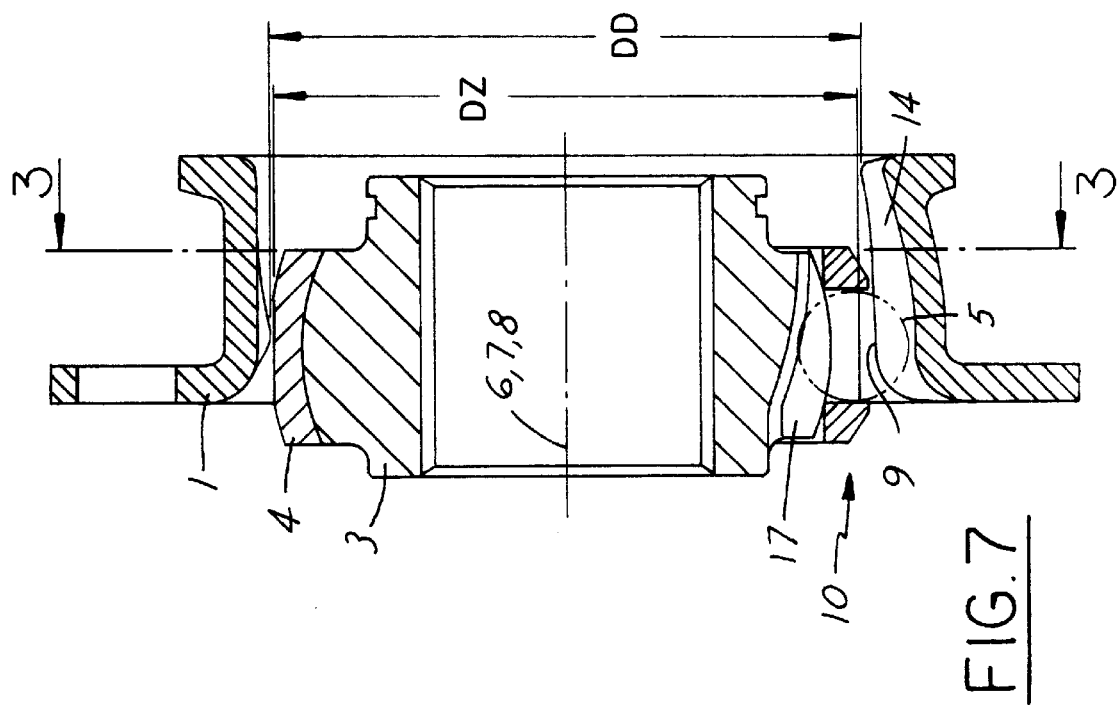
FIG. 7 is a longitudinal section similar to that of FIG. 1, concerning the outer part and inner part, but showing the unit consisting of the inner part, cage, and balls being inserted into the outer part.

FIG. 7 shows the free circular passage of the outer part 1 with reference to the inner face 9 in the region of the first open end 10, with the diameter DD.

The inner part 3 with its longitudinal inner part axis 7 is received in the cavity of the outer part 1 so as to extend concentrically to the longitudinal outer part axis 6. The inner part 7, in its outer face 19 which is spherical with reference to the articulation center 0, is provided with alternatingly arranged first inner running grooves 17 and second inner running grooves 18 which are circumferentially distributed around the longitudinal inner part axis 7.

The first inner running grooves 17 start from the first open end 10 and extend in planes, initially at a constant distance from the longitudinal inner part axis 7, but then curve-like and undercut-free towards the second open end 11, with an increasing distance between their track bases and the longitudinal inner part axis 7. The second inner running grooves 18 start from the second open end 11 and extend in a curve-like and undercut-free way in planes towards the first open end 10, so that initially their track bases, towards the respective other open end, remain at a constant distance from the longitudinal inner part axis and thereafter move away from the associated longitudinal inner part axis 7. Always one first outer running groove 14 is positioned opposite a first inner running groove 17, so that they form pairs and form a cross-section which opens toward the first open end 10. Always one second outer running groove 15 and a second inner running groove 18 are positioned opposite one another and form a cross-section which opens towards the second open end 11.

Furthermore, the inner part 3 comprises an attaching bore 20 which is centered on the longitudinal inner part axis 7 and into which it is possible to insert a connecting shaft. For this purpose, the attaching bore 20 is provided with toothing.

The space between the inner face 9 of the outer part 1 and the spherical outer face 19 of the inner part 4 accommodates the cage 4. As far as the description of the cage 4 is concerned, reference is made to FIGS. 3 to 6. The cage 4 comprises an inner face 21 with a hollow-spherical portion by means of which the cage 4 is guided on the portions of the spherical outer face 19 of the inner part 3, which portions are located between two adjoining inner running grooves 17, 18. In accordance with the pairs of first outer running grooves 14 and first inner running grooves 17 and the pairs of second outer running grooves 15 and second inner running grooves 18, the cage 4 is provided with circumferentially distributed apertures which extend from its inner face 21 to its outer face 22 and from the windows 25 for accommodating the balls 5. The balls 5 are guided between the lateral guiding faces 23, 24 of the windows 25 of the cage 4, which guiding faces are arranged so as to be offset in the direction of the longitudinal cage axis 8. The balls 5 project outwardly into an associated first outer running groove 14 and second outer running groove 15 respectively and inwardly for the purpose of engaging a first inner running groove 17 and a second inner running groove 18 respectively.

By contacting four points, a ball 5 received between an outer running groove and an inner running groove is guided by the associated running grooves into the angle-bisecting plane as a result of extending in a curve-like way in the direction of the longitudinal outer part axis 6 and the longitudinal inner part axis 7 respectively. In consequence, the outer part 1 pivots relative to the inner part 3 at the same time as the cage 4 pivots relative to parts 1 and 3, around a common articulation center 0.

Both the first outer running grooves 14 and the second outer running grooves 15 can be produced in a non-chip forming way in one tool, starting from opposed ends. This also applies to the inner part 3 with the first inner running grooves 17 and the second inner running grooves 18, but the inner part 3 is a solid part. To improve the guiding conditions for the balls 5 in the windows 25 and to facilitate assembly, there is provided another cage design which will be described below with reference to FIGS. 3 to 6.

For the purpose of increasing the length of the guiding faces 23, 24 which, centrally between them, define a central plane 26 containing the centers of all balls 5, the cage 4 comprises lugs 29 which project outwardly beyond the outer face 22.

However, the lugs 29 only extend over a short distance of the cage windows 25 in the circumferential direction around the longitudinal cage axis 8. Furthermore, the cage 4, in its inner face 21, comprises a groove 36 which extends around the longitudinal cage axis 8 and is centered on the central plane 26 and which frees the cage 4 in this region relative to the outer face of the inner part.

In addition, to simplify the assembly of the constant velocity fixed joint, the outer cage face 22 extends as described below. In the central region, i.e. approximately along the axial length of the cage 4 along the longitudinal cage axis 8 between the two guiding faces 23, 24, the outer face 22 comprises a cylindrical outer face portion 27 with the cylinder diameter DZ whose axis corresponds to the longitudinal cage axis 8. Towards said two ends, the cylindrical outer face portion 27 changes into a spherical end portion 28, with the center of the envelope sphere HK delimiting the end portions 32 being located in the point of intersection between the central plane 26 and the longitudinal cage axis 8 and thus in the articulation center 0.

Only the outer lugs 29 project beyond the contour of the envelope sphere HK, which causes no problem because they are located in the region of the first and second outer running grooves 14, 15. Furthermore, the cage 4, in its inner face, is provided with assembly grooves 32, 32' which are positioned in the region of the windows 25, and extend parallel to the longitudinal cage axis 8 and end in the region of a window. Between two diametrically opposed assembly grooves 32, 32', there is provided a passage D which is greater than the diameter of the spherical outer face of the inner cylinder diameter DZ can be introduced into the cavity of the outer part 1, because the cylinder diameter DZ is smaller than the free passage which is arranged towards the first open end 10 and which leaves free a circle with a passage diameter DD. This is shown in FIG. 7.

Figure 8:
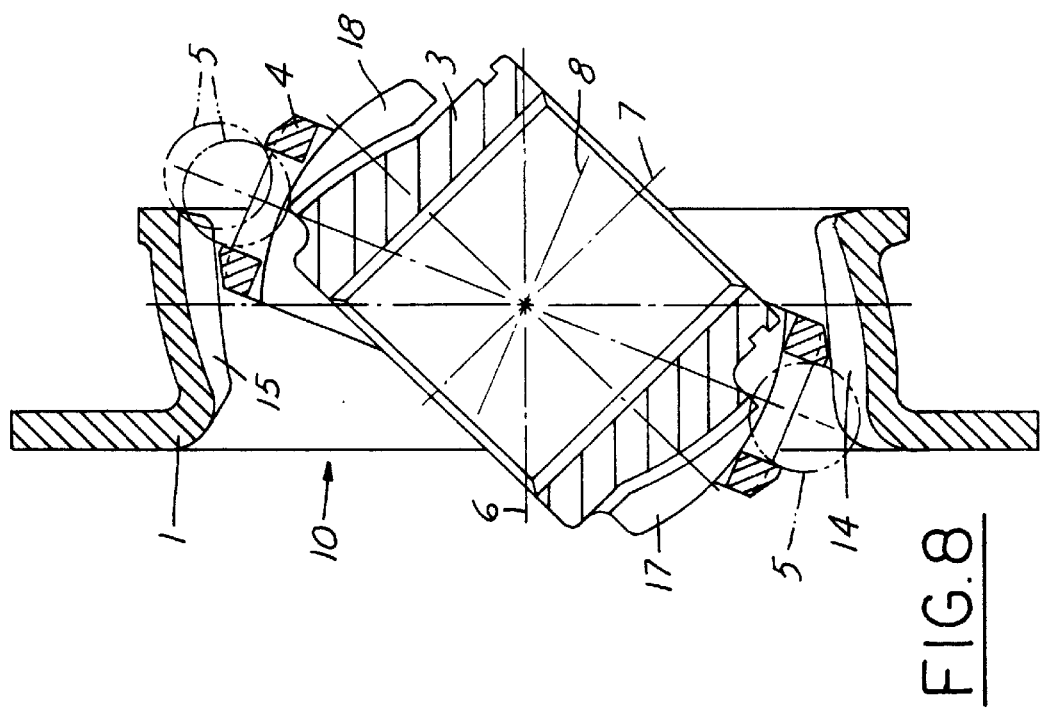
FIG. 8 shows the assembly of the balls associated with the second inner running grooves and outer running grooves, concerning a first track pair of outer running grooves and inner running grooves.

Thereafter, the inner part 3 is articulated relative to the outer part 1 and the balls 5 associated with the second outer running grooves 15 and the second inner running grooves 19 can be introduced into a window 25 one after the other with a position of maximum articulation of a second inner running groove 18 relative to an associated second outer running groove 15, in which position the longitudinal outer and inner part axes 6, 7 are located in one plane and in which the associated window 25 is accessible from the outside. This is illustrated in FIG. 8. In this way, the respective balls 5 can be introduced one after the other into the second outer running groove 15 and the second inner running groove 18. The diameter DZ of the cylindrical portion 27 of the cage 4 is dimensioned in such a way that it is located inside an envelope sphere HK formed by the spherical end portions 28.

What is claimed is:

1. A constant velocity fixed joint comprising:

an outer part (1) comprising a first open end (10) and a second open end (11), a longitudinal outer part axis (6), a cavity which is centered on the longitudinal outer part axis (6) and is open towards both open ends (10, 11), and first outer running grooves (14) and second outer running grooves (15) formed in an inner face (9) delimiting the cavity, wherein the first outer running grooves (14) and the second outer running grooves (15) are arranged in a regular sequence around the longitudinal outer part axis (6) in planes which are distributed around the longitudinal outer part axis (6) and contain same, the first outer running grooves (14) starting from the first open end (10) and extending in a curve-like and undercut-free way towards the second open end (11) and the second outer running grooves (15) starting from the second open end (11) and extending towards the first open end (10) in a curve-like and undercut-free way;

an inner part (3) arranged in the cavity of the outer part (1) comprising a longitudinal inner part axis (7), a spherical outer face (19) and first inner running grooves (17) and second inner running grooves (18) which extend in the spherical outer face (19) in planes which are distributed around the longitudinal inner part axis (7) and contain same, each of the first inner running grooves (17) being arranged opposite a first outer running groove (14) and, while starting from the first open end (10), extending in a curve-like and undercut-free way towards the second open end (11) and each of the second inner running grooves (18) being arranged opposite a second outer running groove (15) and, while starting from the second open end (11), extending in a curve-like and undercut-free way towards the first open end (10);

an angular cage (4) comprising an outer face (22), an inner face (21), a longitudinal cage axis (8) and windows (25) which are distributed in accordance with the pairs of opposed first outer running grooves (14) and first inner running grooves (17) as well as with the pairs of second outer running grooves (15) and second inner running grooves (18) and which are open towards said grooves, said windows (25) comprising guiding faces (23, 24) which are offset along the longitudinal cage axis (8) and are arranged opposite one another, and said annular cage (4) further comprising outer lugs (29) which project from the outer face (22) and which are arranged in the region of the windows (25) to one side of the guiding faces (23, 24) for the purpose of outwardly lengthening the latter, and with said annular cage (4) being arranged between the inner part (3) and the inner face (9) of the outer part (1), with its outer face (22) being held at a distance from the inner face (9); and a plurality of balls (5) wherein each ball is associated with a window (25) for the purpose of engaging an associated first outer running groove (14) and first inner running groove (17) as well as an associated second outer running groove (15) and a second inner running groove (18), and which are guided between the guiding faces (23, 24);

wherein the outer face (22) of the cage (4), in the circumferential direction between the outer lugs (29), comprises a cylindrical portion (27) whose axis is formed by the longitudinal cage axis (8) and whose cylinder diameter (DZ) is smaller than the free open diameter (DD) of the first open end (10) and wherein the outer face (22) of the cage (4) is provided with end portions (28) which extends inside an envelope sphere (HK) which envelops same and whose center is located in the point of intersection (0) between a plane (26) and the longitudinal cage axis (8), which plane (26) contains the centers of all windows (25) between the guiding faces (23, 24), and wherein the diameter (DK) of the envelope sphere (HK) is greater than the cylinder diameter (DZ).

2. A constant velocity fixed joint according to claim 1, wherein in that the end portions (28) are adapted to the shape of the envelope sphere (HK).

3. A constant velocity fixed joint according to claim 1, wherein the inner face (21) of the cage (4) comprises a hollow spherical portion by which the cage (4) is guided on the spherical outer face (19) of the inner part (3) and that the cage (4), in its inner face (21), is provided with assembly grooves (32, 32') which are positioned in the region of the windows (25) and end therein and start from at least one end face.

4. A method of assembling a constant velocity fixed joint, having an outer part (1), an inner part (3), a cage (4), and balls (5) according to one of claims 1 to 3, the method comprising the steps of:

sliding the cage (4), in a turned position, in association with assembly grooves 32, 32' over the inner part (3);

thereafter rotating the cage (4) relative to the inner part (3) in such a way that the windows overlap with the first and the second inner running grooves (17, 18);

thereafter, introducing the balls (5) from the outside through the windows (25) of the cage (4), said windows being associated with the first inner running grooves (17), into the first inner running grooves (17);

thereafter, axially introducing the unit consisting of the cage (4), the inner part (3) and the balls (5) into the outer part (1), so that the balls (5) engage the first outer running grooves (14); and thereafter, articulating the inner part (3) relative to the outer part (1) in such a way that a window (25) as yet unoccupied by a ball (5) becomes accessible from the second open end (11), through which window (25) the ball (5) is introduced into the associated inner running groove (17) and wherein the operation is then repeated for the subsequent windows (25) after the joint has been rotated by one track division of the second running grooves (15, 18) in the articulated condition or that initially the inner part (3) and the outer part (1) are temporarily moved back into the aligned position relative to one another, in the course of which movement the ball is transferred into the second outer running groove (15) of the outer part (1) and that subsequently, the inner part (3) is again articulated relative to the outer part (1) for the purpose of exposing the next window.

* * * * *